Aug. 8, 1961 C. V. BRICE 2,995,275
KEY-CONTROLLED SELECTIVE REGISTER AND CONTROL
MECHANISM FOR LIQUID DISPENSING PUMPS
Filed Nov. 21, 1958 3 Sheets-Sheet 1

INVENTOR.
CLIFFORD V. BRICE,
BY
McMorrow, Berman + Davidson
ATTORNEYS.

INVENTOR.
CLIFFORD V. BRICE,
BY
McMorrow, Berman & Davidson
ATTORNEYS.

Aug. 8, 1961  C. V. BRICE  2,995,275
KEY-CONTROLLED SELECTIVE REGISTER AND CONTROL
MECHANISM FOR LIQUID DISPENSING PUMPS
Filed Nov. 21, 1958  3 Sheets-Sheet 3
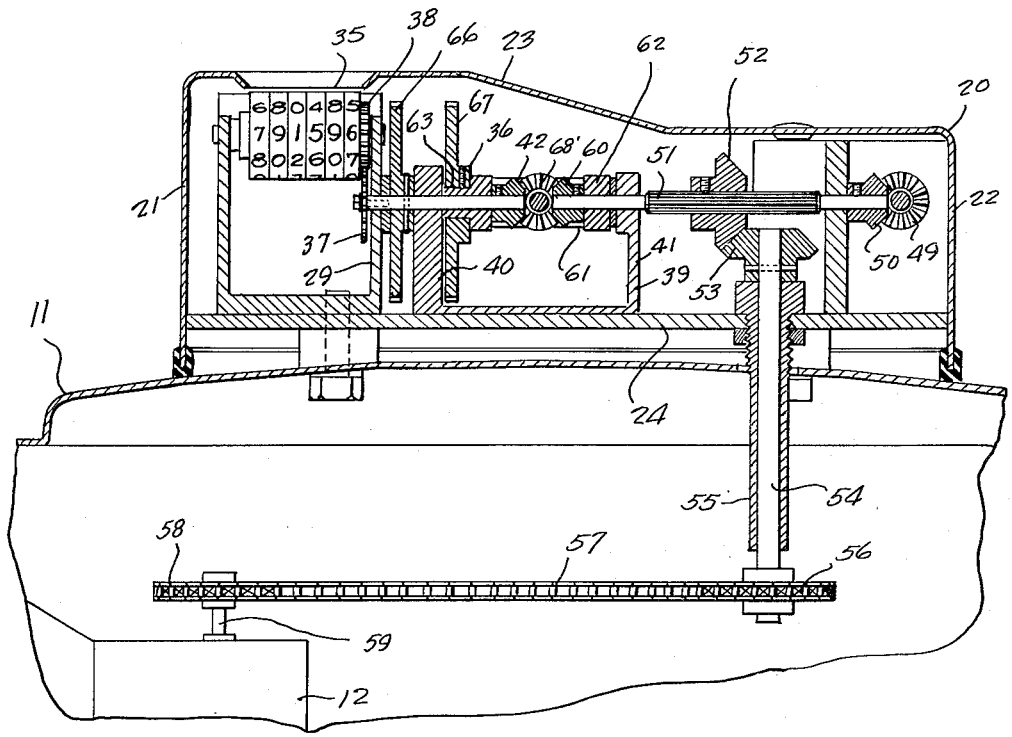
INVENTOR.
CLIFFORD V. BRICE,
BY
McMorrow, Berman + Davidson
ATTORNEYS.

2,995,275
KEY-CONTROLLED SELECTIVE REGISTER AND CONTROL MECHANISM FOR LIQUID DISPENSING PUMPS

Clifford V. Brice, 320 E. Orman Ave., Pueblo, Colo.
Filed Nov. 21, 1958, Ser. No. 775,512
5 Claims. (Cl. 222—26)

This invention relates to liquid dispensing pumps, and more particularly to liquid dispensing pumps of the type provided with a plurality of auxiliary output indicators operable concurrently with the main output indicator of the pump, each auxiliary output indicator being controlled by individual key-operated means, whereby the pump may be operated by the insertion of a proper key in any one of the key-operated means, providing registration of the amount of liquid dispensed by the pump by the clerk or other person having the key.

A main object of the invention is to provide a novel and improved meter assembly for a liquid dispensing pump or similar device, said meter assembly being provided with a group of auxiliary meters selectively operable along with the main output meter of the liquid dispensing pump, each auxiliary meter being key-controlled and being operable by a person employing a proper key to draw liquid from the dispenser, whereby individual registrations are provided for the persons operating the liquid dispenser and having the respective keys.

A further object of the invention is to provide a novel and improved means to register the quantity of liquid dispensed by respective persons from a single source, for example, from a gasoline pump, in order to provide a check against unauthorized withdrawal of liquid from the pump.

A still further object of the invention is to provide means associated with a source of liquid to permit each of a group of persons to withdraw material from the source through a single channel, to measure the quantity drawn from the source by the respective persons, and to prevent any unauthorized person from registering the material withdrawn from the source to the wrong person.

A still further object of the invention is to provide an improved liquid withdrawn register for use on a gasoline pump, or similar liquid dispenser, having means to register the liquid withdrawn from the pump by different persons, the registering means providing unmistakable indications of the respective quantities of liquid withdrawn from the dispenser by each person, whereby the accounting of the establishment in which the liquid dispenser is located is greatly simplified, whereby each person employed in the establishment and having access to the dispenser may be accurately and properly charged with the quantity of liquid dispensed by him, and whereby shortages of the merchandise in the liquid dispenser in the establishment are minimized.

A still further object of the invention is to provide a novel and improved register attachment for a gasoline pump or similar liquid dispenser adapted to provide positive and accurate indications of the respective quantities of liquid withdrawn from the pump by respective different employees or clerks operating same, the attachment being simple in construction, being easy to install, and being reliable in operation.

Further objects and advantages of the invention will become apparent from the following description and claims, and from the accompanying drawings, wherein:

FIGURE 3 is a horizontal cross sectional view taken substantially on the line 3—3 of FIGURE 2.

FIGURE 4 is an enlarged cross sectional detail view taken longitudinally through one of the key-controlled register-actuating assemblies employed in the dispensing register attachment of FIGURES 1 to 3, showing the assembly with a proper key inserted therein and actuated to place its associated output indicator in operation.

Figure 1:
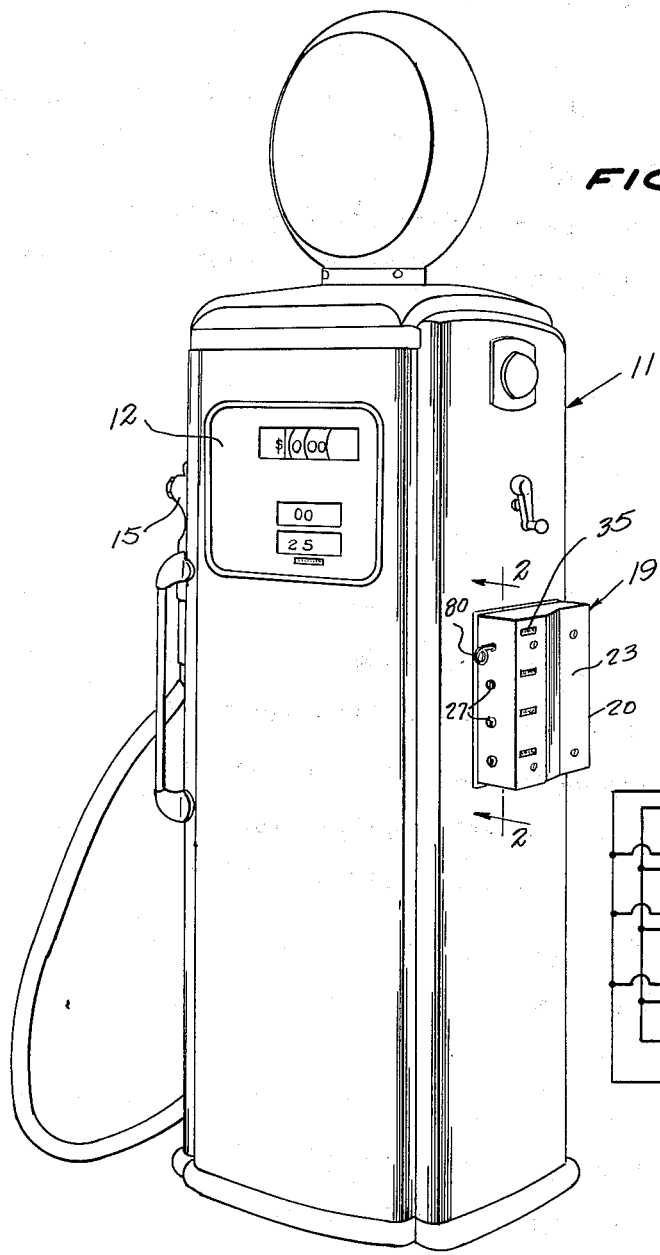
FIGURE 1 is a perspective view of a gasoline pump provided with an improved dispensing register constructed in accordance with the present invention.
Figure 5:
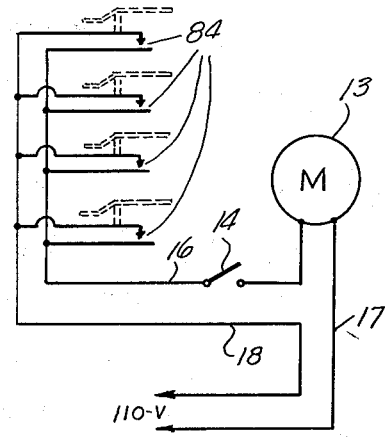
FIGURE 5 is a schematic wiring diagram showing the electrical connections of the respective control switches employed in the dispensing register attachment of FIGURES 1 to 4 and showing how the control switches are connected in the energizing circuit of the electric motor associated with the dispensing pump.

Referring to the drawings, 11 generally designates a substantially conventional liquid dispensing pump, namely, a gasoline dispensing pump, provided with a main output indicator 12 driven by the pump concurrently with the energization of the pump motor, shown diagrammatically at 13 in the wiring diagram of FIGURE 5. The pump motor is energized in a conventional manner by closing suitable switch means 14 when it is desired to discharge gasoline from the pump, for example, switch means mounted on the dispensing nozzle 15 of the pump, said switch means being conventional in construction and forming no part of the present invention. As shown in FIGURE 5, the nozzle-operated switch means 14 is connected in series with the pump motor 13, namely, is connected in one of the motor line wires 16. The other motor line wire, shown at 17, is connected to one terminal of a suitable source of electric power. The other terminal of the source is connected to a line wire 18.

Designated generally at 19 is a selective register attachment for controlling the pump in conjunction with the switch means 14 associated with the nozzle 15 and for providing individual registration of the amounts of gasoline dispensed from the pump by respective different employees of the filling station or other establishment in which the pump is located.

The selective register device 19 comprises a generally rectangular main housing 20 which is mounted in any suitable manner on the side wall of the pump 11. Housing 20 comprises the side walls 21 and 22, the front wall 23, the back wall 24, the top wall 25 and the bottom wall 26.

Rigidly secured in housing 20 adjacent and extending parallel to the side wall 21 is a generally channel-shaped bracket structure 27 comprising the parallel plate members 28 and 29 connected by cross bars 30, said cross bars being secured to the back wall 24 of housing 20. Mounted between the plate members 28 and 29 are a plurality of auxiliary liquid output indicators 31, 32, 33 and 34 of conventional construction which are located rearwardly adjacent the front wall 23 of housing 20 and which are exposed through respective windows 35 provided in said front wall. As will be seen from FIGURE 3, the windows 35 are of sufficient size so that the numerical readings of the respective counter units may be readily observed.

Each counter unit 31 is provided with an actuating shaft 36 on one end of which is secured an actuating gear 37 which meshingly engages the operating gear 38 of the counter assembly.

Secured to the back wall 24 of housing 20 adjacent each auxiliary output assembly is a gear box 39 having the respective vertical end walls 40 and 41. As shown in FIGURE 3, each actuating shaft 36 is journaled in the plate member 29 and has a bevel gear 42 secured to the end thereof opposite the gear 37.

Designated at 43 is a generally rectangular frame comprising the vertical plate element 44, the horizontal top and bottom plate elements 45 and 46 and the horizontal intermediate plate element 47, said plate elements being rigidly secured together and being secured to the rear wall 24. Journaled in the horizontal plate elements 45, 46 and 47 is a vertical counter shaft 48 provided with respective bevel gears 49 meshing with mating bevel gears 50 mounted on respective shafts 51 journaled in the plate element 44 and the end walls 41 of the gear boxes 39, said shafts being arranged in axial alignment with the respective output indicator actuating shaft 36. Mounted on one of the shafts 51 is a bevel gear 52 which meshingly engages a driving bevel gear 53 mounted on the end of a shaft 54 which is journaled in a bearing sleeve 55 secured in back wall 24, the opposite end of shaft 54 being provided with a sprocket wheel 56 which is coupled by a sprocket chain 57 to a driving sprocket wheel 58 secured on the end of the shaft 59 of the main indicator 12, whereby the driving shaft 54 for the auxiliary indicators is rotated simultaneously with the operation of the main indicator 12. As will be further apparent from FIGURE 2, the torque from the driving shaft 54 is transmitted through bevel gears 53 and 52 and the shaft 51 on which the bevel gear 52 is mounted to the counter shaft 48, whereby all of the shafts 51 are simultaneously driven.

Secured on the end of each shaft 51 inwardly adjacent the associated gear box wall 41 is a bevel gear 60.

Rotatably mounted on the axially aligned pairs of shafts 36 and 51 are respective planetary gear frames 61, said gear frames comprising opposing journal sleeve portions 62 and 63, respectively rotatably mounted on the axially aligned shaft elements 51 and 36, and being connected by opposing rigid bracket portions 64 and 65' in which is transversely mounted a shaft 66' on which are journaled respective bevel gears 68' and 69' which intermesh with the opposing bevel gears 42 and 60. As shown in FIGURE 3, the journal sleeve portions 62 are located between the gear box end walls 41 and the bevel gears 60 on the shafts 51, and the shafts 36 carrying the journal sleeve portions 63 are journaled in the gear box wall members 40.

Rigidly secured on each auxiliary output indicator actuating shaft 36 between plate member 29 and the associated wall member 40 is a toothed disc member 66. Rigidly secured on each sleeve element 63 is a similar toothed disc member 67. Thus, the disc member 67 is located inwardly adjacent to the gear box wall 40 of the associated planetary gear assembly and is disposed parallel to the toothed disc 66 of the associated indicator actuating shaft 36. The toothed discs 66 and 67 are preferably substantially identical in diameter.

Figure 2:
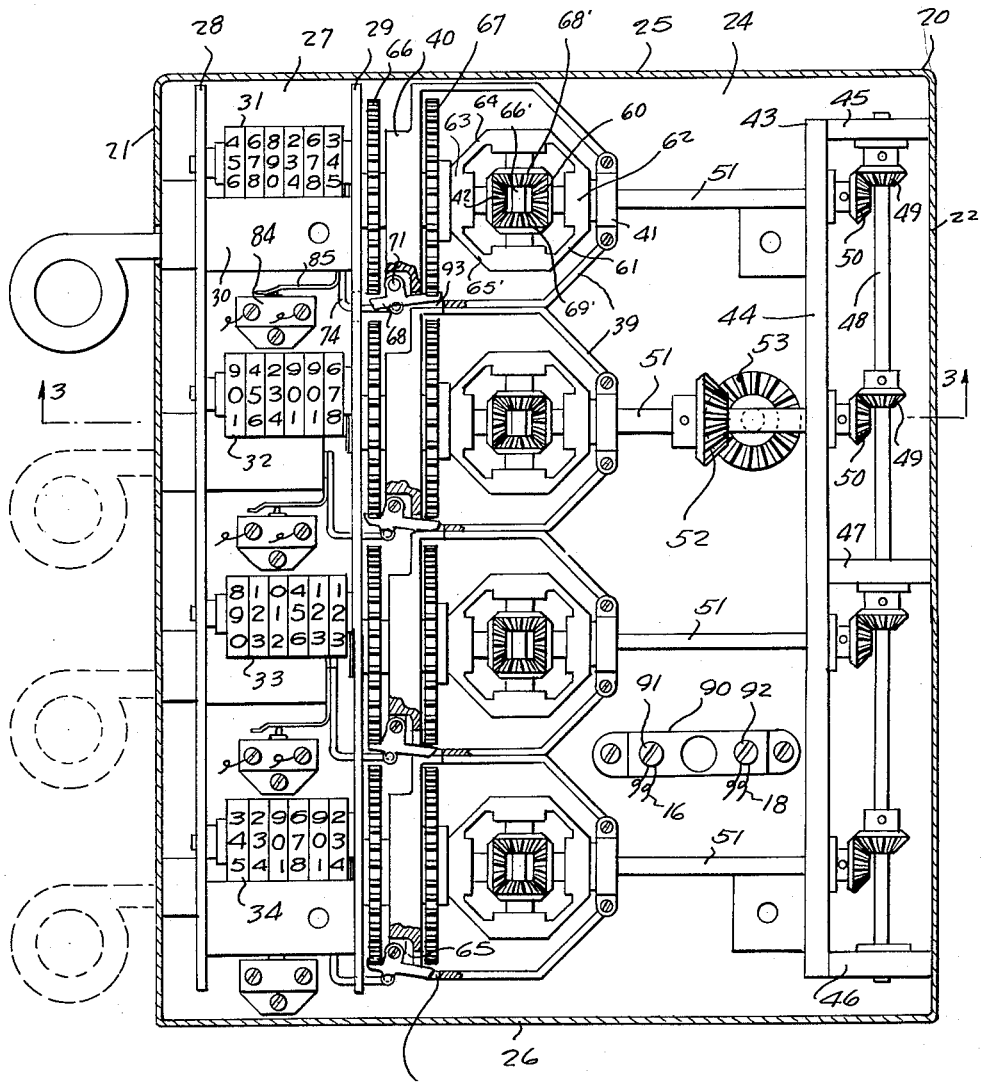
FIGURE 2 is an enlarged vertical cross sectional view taken through the main housing of the dispensing register of FIGURE 1 substantially on the line 2—2 of FIGURE 1.

As shown in FIGURES 2 and 4, the gear box end walls 40 are formed with slots 65 and the adjacent side walls of the gear boxes are formed with slot portions 93 communicating with the slots 65 and exposing the toothed peripheries of the discs 67. Pivoted in the slots 65 at 71 are respective control levers 68, each control lever having the respective opposing arms 69 and 70 adapted to selectively lockingly engage with the peripheries of the adjacent toothed discs 66 and 67. As shown in FIGURE 4, the pivotal connection 71 of each control lever 68 is inwardly offset a substantial distance relative to the engaging edges of the locking arms 69 and 70 so that said locking arms may be rotated into and out of locking engagement responsive to a relatively small angular movement of the control lever 68 about its pivotal connection 71. When the control lever 68 is rotated in a counterclockwise direction, as viewed in FIGURE 4, the arm 69 lockingly engages with the disc member 67, locking the associated planetary gear frame 61 against rotation whereby torque is transmitted from the associated driving shaft 51 to the associated output indicator actuating shaft 36. However, when the control lever 68 is rotated clockwise from the position illustrated in FIGURE 4 to a position wherein arm 70 lockingly engages the periphery of the associated toothed disc 66 and arm 69 disengages from the periphery of the associated toothed disc 67, the output indicator actuating shaft 36 is locked against rotation and the associated planetary gear frame 61 is free to rotate. This allows the driving shaft 51 associated with the released planetary gear frame 61 to rotate the gear frame without transmitting any torque to the associated output indicator actuating shaft 36, said shaft being held stationary.

Each control lever 68 is provided opposite its pivotal connection 71 with an outwardly projecting ball element 72, said ball element being rotatably received in a socket element 73 provided on the end of an arm 74. The arm 74 is rigidly secured to the end of a key-controlled plunger element 75 slidably mounted in a barrel member 76 secured to the back wall 24 of housing 20 adjacent the side wall 21.

Side wall 21 is formed with a plurality of key apertures 77 aligned with the bores of the respective barrel members 76, said barrel members being provided with the tumbler pins 78 cooperable with tumbler pins 79 provided in the plunger members 75, whereby each plunger 75 is locked against longitudinal movement in the associated barrel member 76 unless a proper key 80 is inserted in the plunger member. A biasing spring 81 is provided in an enlarged bore portion 82 of the barrel member, bearing against an end flange 83 provided on the associated plunger member 75, exerting a light biasing force on the plunger member whereby said plunger member is moved to a position wherein the tumbler elements 79 and 78 are aligned when the key 80 is removed, and whereby the tumbler elements 78 lockingly interengage with the plunger 75 to prevent inward movement of the plunger member. Under these conditions, the associated control lever 68 is rotated to its counterclockwise position, namely, to the position opposite to that illustrated in FIGURE 4, wherein the arm 70 engages the toothed periphery of the associated disc member 66. When a proper key 80 is inserted in the plunger member 75, the plunger tumbler pins 79 are moved to positions wherein the inner ends of the barrel plunger pins 78 are substantially in alignment with the outer surface of the plunger member 75, allowing the plunger member to be pushed inwardly by the key 80, whereby arm 74 rotates lever 68 from its normal locked position to the counterclockwise-rotated positions thereof illustrated in FIGURE 4, releasing the associated output indicator actuating shaft 36 and locking the associated planetary gear assembly frame 61 against rotation, as above described, whereby torque may be transmitted from the driving shaft 51 associated with the selected output indicator shaft 36. Since the biasing spring 81 is relatively light, the selected plunger element 75 will remain in its inwardly moved position by the friction between the plunger member 75 and the bore of the associated barrel member 76 until the key 80 is pulled out of the plunger member 75. The retraction of the key 80 moves the plunger member 75 back to its normal locked position and rotates the control lever 68 so that arm 70 lockingly engages the associated toothed disc member 66.

Respective micro switches 84 are mounted subjacent the barrel members 76, each plunger member being provided with a switch-operating arm 85 having an offset end portion 86 engageable with the operating pin 87 of the associated micro switch 84 when the plunger member 75 is pushed inwardly, as above described. As shown in FIGURE 5, the micro switches 84 are connected in parallel between the wires 16 and 18, so that said wires 16 and 18 are connected together electrically whenever any one of the micro switches 84 is closed, so that the pump motor 13 will be energized as soon as the nozzle-controlled switch 14 is closed.

In operation, when a proper key 80 is inserted in the appropriate key opening 77 and releases its associated plunger member 75, whereby the plunger member 75 is pushed forwardly to the position thereof shown in FIGURE 4, the associated disc 66 is released and the arm 69 engages the associated disc member 67, locking the associated planetary gear frame 61 against rotation. When the nozzle-operated switch 14 is closed, the pump motor 13 is actuated, starting the main indicator 12 and at the same time causing all of the shaft elements 51 to rotate. The planetary gear frame 61 associated with the selected auxiliary output indicator will be locked against rotation, whereby torque will be transmitted from the driving shaft 51 associated therewith to the auxiliary output indicator shaft 36 axially aligned therewith. The selected auxiliary output indicator will thus operate to provide a registration of the liquid dispensed, concurrently with the registration provided on the main indicator 12. The remaining auxiliary output indicators will remain unchanged, since they are held locked by the engagement of the locking arms 70 of their associated control levers 68 with their disc members 66.

As shown in FIGURE 2, a suitable terminal block 90 may be mounted in the housing 20, said terminal block being provided with the respective terminals 91 and 92 to which the wires 16 and 18 may be connected, and to which the leads from the respective micro switches 84 may be similarly connected, whereby to establish the electrical connections shown in FIGURE 5.

While a specific embodiment of an improved selective register and control mechanism for liquid dispensing pumps has been disclosed in the foregoing description, it will be understood that various modifications within the spirit of the invention will occur to those skilled in the art. Therefore, it is intended that no limitations be placed on the invention except as defined by the scope of the appended claims.

What is claimed is:

1. In a liquid dispensing pump, an output indicator provided with an actuating shaft having a toothed disc member and an actuating gear mounted thereon, a driving gear axially aligned with said actuating gear, a planetary gear assembly rotatably mounted between said gears and meshingly engaged therewith for rotation around their common axis, a second toothed disc member, spaced from said first disc member, rigidly connected to said planetary gear assembly and being parallel to and coaxial with the first-named disc member, and a key-operated control lever pivoted between said disc members and being selectively lockingly engageable with the teeth thereof, whereby said actuating shaft is locked when said lever lockingly engages the first-named disc member, and whereby said actuating shaft is released and said planetary gear assembly is locked against rotation and transmits torque from the driving gear to the actuating gear when said lever lockingly engages the second disc member.

2. In a liquid dispensing pump, an output indicator provided with an actuating shaft having a toothed disc member and an actuating gear mounted thereon, a driving gear axially aligned with said actuating gear, a planetary gear assembly rotatably mounted between said gears and meshingly engaged therewith for rotation around their common axis, a second toothed disc member, spaced from said first disc member, rigidly connected to said planetary gear assembly and being parallel to and coaxial with the first-named disc member, and a key-operated control lever pivoted to selectively lockingly engage with the teeth of said disc members, whereby said actuating shaft is locked when said lever lockingly engages the first-named disc member, and whereby said actuating shaft is released and said planetary gear assembly is locked against rotation and transmits torque from the driving gear to the actuating gear when said lever lockingly engages the second disc member.

3. In a liquid dispensing pump, an output indicator provided with an actuating shaft having a toothed disc member and an actuating gear mounted thereon, a driving gear axially aligned with said actuating gear, an electric motor drivingly connected to said driving gear, an energizing circuit including a control switch connected to said electric motor, a planetary gear assembly rotatably mounted between said gears and meshingly engaged therewith for rotation around their common axis, a second toothed disc member, spaced from said first disc member, rigidly connected to said planetary gear assembly and being parallel to and coaxial with the first-named disc member, a control lever pivoted to selectively lockingly engage with the teeth of said disc members, whereby said actuating shaft is locked when said lever engages the first-named disc member, and whereby said actuating shaft is released and said panetary gear assembly is locked against rotation and transmits torque from the driving gear to the actuating gear when said lever lockingly engages the second disc member, and means to simultaneously rotate said lever into locking engagement with said second disc member and close said control switch.

4. In a liquid dispensing pump, a plurality of output indicators, each output indicator being provided with an actuating shaft having a toothed disc member and an actuating gear mounted thereon, respective driving gears axially aligned with said actuating gears, an electric motor drivingly connected to said driving gears to simultaneously rotate same, an energizing circuit including respective parallel-connected control switches connected to said electric motor, each control switch being associated with one of the output indicators, respective planetary gear assemblies rotatably mounted between each set of actuating and driving gears and meshingly engaging therewith for rotation around their common axes, respective additional toothed disc members, spaced from the disc members on the associated output indicator actuating shafts, secured to the planetary gear assemblies and being coaxial and parallel to the disc members on the associated output indicator actuating shafts, respective key-operated control levers pivoted adjacent the coaxial parallel disc members to selectively lockingly engage with the teeth of same, whereby the output indicators are locked when the control levers engage the disc members on the actuating shafts, and whereby each actuating shaft is released and its associated planetary gear assembly is locked against rotation to transmit torque to the actuating shaft when its associated control lever is rotated to lockingly engage the disc member on said associated planetary gear assembly, and means to simultaneously rotate the control lever associated with each output indicator into locking engagement with the disc member on its associated planetary gear assembly and to close the associated control switch.

5. In a liquid dispensing pump, an output indicator provided with an actuating shaft having an actuating gear and a toothed detent disc thereon, a driving gear axially aligned with said actuating gear, a planetary gear assembly rotatably mounted between and on the same axis as said gears and meshingly engaged therewith for rotation around their common axis, a second toothed detent disc on said planetary gear assembly and being spaced from said first detent portion, and a control element movably mounted to selectively lockingly engage said detent discs, whereby said actuating shaft is locked when said control element lockingly engages the first-named detent disc, and whereby said actuating shaft is released and said planetary gear assembly is locked against rotation and transmits torque to the actuating gear when said control element lockingly engages the second detent disc.

References Cited in the file of this patent
UNITED STATES PATENTS

| | | |
|---|---|---|
| 1,681,384 | Waters | Aug. 21, 1928 |
| 1,890,078 | Enochs et al. | Dec. 6, 1932 |
| 1,963,308 | Molinelli | June 19, 1934 |
| 2,522,845 | Stevens | Sept. 19, 1950 |